United States Patent
Micke et al.

(10) Patent No.: US 9,140,256 B2
(45) Date of Patent: Sep. 22, 2015

(54) ELECTRIC MOTOR

(71) Applicant: Robert Bosch GmbH, Stuttgart (DE)

(72) Inventors: Marc Micke, Boennigheim (DE); Reiner Fellmeth, Besigheim (DE); Stefan Klein, Nordheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/360,264

(22) PCT Filed: Sep. 27, 2012

(86) PCT No.: PCT/EP2012/069033
§ 371 (c)(1),
(2) Date: May 22, 2014

(87) PCT Pub. No.: WO2013/075868
PCT Pub. Date: May 30, 2013

(65) Prior Publication Data
US 2014/0314349 A1   Oct. 23, 2014

(30) Foreign Application Priority Data
Nov. 25, 2011  (DE) .......................... 10 2011 087 083

(51) Int. Cl.
*F16C 21/00* (2006.01)
*F16C 27/00* (2006.01)
*F04B 53/00* (2006.01)
*H02K 5/167* (2006.01)
*F16C 27/04* (2006.01)
(Continued)

(52) U.S. Cl.
CPC ............. *F04B 53/001* (2013.01); *F16C 27/045* (2013.01); *F16C 32/0629* (2013.01); *H02K 5/1672* (2013.01); *F16C 21/00* (2013.01); *F16C 33/106* (2013.01)

(58) Field of Classification Search
CPC ................................ F16C 27/045; F16C 39/04
USPC ............................................. 384/99, 101, 102
See application file for complete search history.

(56) References Cited

U.S. PATENT DOCUMENTS

| 3,272,999 A | 9/1966 | Turk |
| 4,701,651 A | 10/1987 | Tanaka |

FOREIGN PATENT DOCUMENTS

| DE | 1 286 344 | 1/1969 |
| DE | 197 20 615 C1 | 6/1998 |
| DE | 197 37 045 A1 | 3/1999 |

(Continued)

OTHER PUBLICATIONS

International Search Report corresponding to PCT Application No. PCT/EP2012/069033, mailed May 15, 2014 (German and English language document) (7 pages).

*Primary Examiner* — Phillip A Johnson
(74) *Attorney, Agent, or Firm* — Maginot, Moore & Beck LLP

(57) ABSTRACT

An electric motor includes an armature shaft which is mounted in at least one floating bearing. The floating bearing comprises a bearing inner ring, which is positioned on the armature shaft, a bearing outer ring, which is received in a bearing seat, and a fluid pump for a vehicle fluid system having the electric motor. Lubricant disposed between the armature shaft and the bearing inner ring forms a hydrodynamic lubricant film and generates a constant relative movement between the armature shaft and the bearing inner ring.

6 Claims, 2 Drawing Sheets

(51) Int. Cl.
   *F16C 32/06*   (2006.01)
   *F16C 33/10*   (2006.01)

(56) References Cited

FOREIGN PATENT DOCUMENTS

| | | | |
|---|---|---|---|
| DE | 10 2006 042 340 A1 | 3/2008 |
| EP | 1 041 700 A2 | 10/2000 |
| JP | S55-94092 A | 7/1980 |
| JP | 63-124050 U | 8/1988 |
| JP | 08296637 A * | 11/1996 |
| JP | H08-296637 A | 11/1996 |
| JP | 2002-142406 A | 5/2002 |
| JP | 2007303617 A * | 11/2007 |
| JP | 2008-008412 A | 1/2008 |

* cited by examiner

ELECTRIC MOTOR

This application is a 35 U.S.C. §371 National Stage Application of PCT/EP2012/069033, filed on Sep. 27, 2012, which claims the benefit of priority to Serial No. DE 10 2011 087 083.0, filed on Nov. 25, 2011 in Germany, the disclosures of which are incorporated herein by reference in their entirety.

The invention proceeds from an electric motor.

BACKGROUND

Electric motors of the abovementioned type are frequently used as a drive for hydraulic pumps in vehicle hydraulic systems, such as anti-lock brake systems (ABS) or traction control systems (ASR system) or electronic stability program systems (ESP system). Electric motors of this type comprise various bearing arrangements for mounting an armature shaft both in the radial and in the axial direction. Said bearing arrangements usually have both what are known as locating bearings and also what are known as floating bearings. Said bearing arrangements frequently cause undesired noise development during the operation of the electric motor.

The laid-open specification DE 10 2006 042 340 A1 describes, for example, an electric motor with an armature shaft which is received in a bearing arrangement. Here, the armature shaft is mounted in at least one floating bearing which comprises a bearing inner ring which is arranged on the armature shaft and a bearing outer ring which is received in a bearing seat.

SUMMARY

The electric motor according to the disclosure and the fluid pump according to the disclosure have the advantage, in contrast, that lubricant is introduced between the drive shaft and the bearing inner ring, which lubricant forms a hydrodynamic lubricant film and generates a constant relative movement between the drive shaft and the bearing inner ring. A permanent supply with introduced lubricant is thus advantageously ensured during the operation of the electric motor, as a result of which the drive shaft and the bearing inner ring have a constant slip. As a consequence, the hydrodynamic lubricant film makes a constant relative movement between the drive shaft and the bearing inner ring possible during the operation of the electric motor, whereby not only the radial loadings between the drive shaft and the bearing inner ring can be damped, but also a considerable noise reduction of the electric motor can be achieved. The drive shaft rotates coaxially with the floating bearing within the bearing inner ring virtually without friction, which results in a reduction in the loading of the drive shaft and the bearing inner ring and a decrease in the wear of the electric motor according to the disclosure. On account of the lubricating film according to the disclosure which is generated, embodiments of the electric motor according to the disclosure have a relatively high load-bearing capability, as a result of which the running time and the service life of the electric motor can be increased. No additional components are advantageously required, in order to form the hydrodynamic lubricant film and to achieve a constant relative movement between the drive shaft and the bearing inner ring, with the result that no additional manufacturing costs for additional components are produced in order to improve the noise behavior of the electric motor.

Advantageous improvements of the electric motor are possible by way of the measures and developments which are described in the disclosure and the claims.

It is particularly advantageous that the hydrodynamic lubricant film can be formed by way of wetting of the bearing inner ring with lubricant. The lubricant can advantageously be conveyed rapidly into the narrowing lubricating gap on account of the capillary effect and the relative movement of the two contact faces of the drive shaft and the bearing inner ring with respect to one another. The pressure which is produced in the process in the lubricant film is so high that the contact faces are separated, as a result of which a constant relative movement can be achieved between the drive shaft and the bearing inner ring. During the operation of the electric motor, homogeneous radial wetting of the bearing inner ring with introduced lubricant is possible. Permanent wetting of the inner face of the bearing inner ring with lubricant ensures a continuous lubricant film which cannot break down. Here, the floating bearing in the electric motor is configured to be so compact and of such small design that a small quantity of the lubricant is sufficient to permanently achieve the desired effect of homogeneous wetting of the bearing inner ring by way of lubricant and therefore a reduction in noise. Permanent wetting of the bearing inner ring with lubricant ensures a lubricant film, as a result of which the wear and the development of noise can be reduced to a pronounced extent.

The lubricant can be configured, for example, as oil and/or grease. If oil and/or grease are/is used as lubricant, a hydrodynamic lubricant film is advantageously formed very rapidly, which hydrodynamic lubricant film can effectively prevent material wear between the two contact faces and the development of noise. In the case of ideal lubrication by way of oil and/or grease, a reduction of friction and material wear between two contact faces which move relative to one another can be achieved, in particular. Since the lubricant effectively prevents or bridges direct contact between the two contact faces of the drive shaft and the bearing inner ring during the operation of the electric motor, no contact which causes a metallic noise can be produced in an advantageous way, as a result of which a considerable reduction in noise of the electric motor according to the disclosure is possible.

In a further refinement of the electric motor according to the disclosure, the quantity of the lubricant is selected in such a way that a closed hydrodynamic lubricant film is formed. As a result, an ideal hydrodynamic lubricant film can advantageously always be formed during the operation of the electric motor, and an optimum constant relative movement between the drive shaft and the bearing inner ring can thus be set.

One preferred implementation of the electric motor according to the disclosure provides that the floating bearing is configured as an antifriction bearing. One essential advantage of an antifriction bearing consists in that it can fix a drive shaft, the antifriction bearing absorbing the radial and axial forces and, at the same time, making a rotation of the drive shaft and components which are mounted on the drive shaft possible, such as a commutator or armature windings. As a result of the use of an antifriction bearing, friction forces can be reduced, in particular, with the result that the power loss of the electric motor and the wear can be lowered. Since the rolling bodies in the bearing inner ring and bearing outer ring usually roll on the hardened steel surfaces with optimized lubrication, the rolling friction and therefore the development of noise of said bearings is relatively low. One essential advantage of the antifriction bearing is the low lubrication requirement, as a result of which said antifriction bearings can operate with low friction at high loads in the electric motor and are suitable, in particular, for use in the case of frequently changing rotational speeds.

The noise-reduced electric motor according to the disclosure can advantageously be used as a drive for a fluid pump in a vehicle fluid system, preferably as a drive for a restoring pump in a vehicle brake system. In principle, embodiments of the electric motor according to the disclosure can also be used as electric drives for other systems, in particular in a motor vehicle.

One exemplary embodiment of the disclosure is shown in the drawings and will be explained in greater detail in the following description. In the drawings, identical designations denote components or elements which carry out identical or analogous functions.

DETAILED DESCRIPTION

Figure 1:
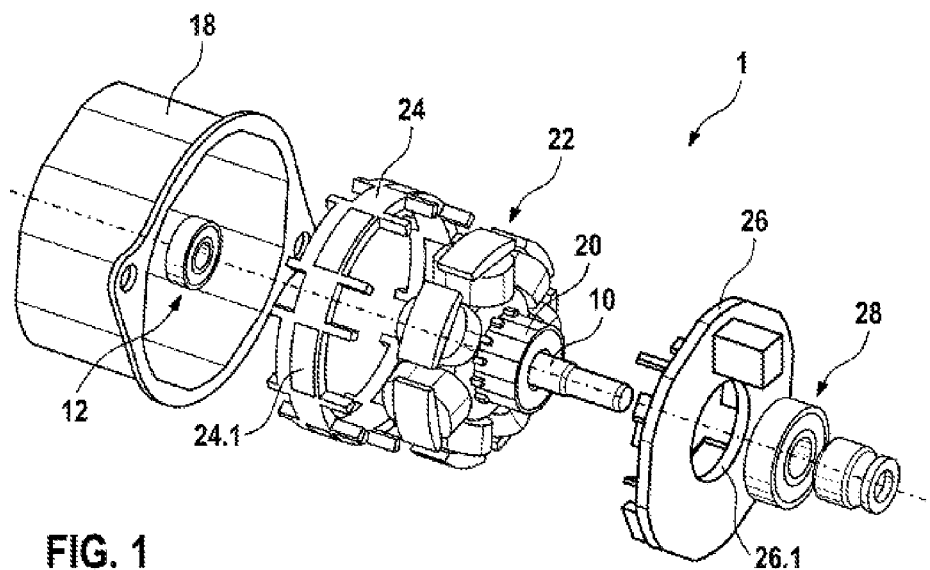
FIG. 1 shows an exploded illustration of one exemplary embodiment of an electric motor according to the disclosure having an armature shaft which is mounted in a floating bearing which is received in a bearing seat of a pole casing, a lubricant film being formed between the armature shaft and the floating bearing.

FIG. 1 shows an electric motor 1 according to the disclosure which can preferably be used as a drive for a hydraulic pump in a vehicle hydraulic system, even if embodiments of the electric motor 1 according to the disclosure can in principle also be used as drives for other vehicle systems.

As can be seen from FIG. 1, the electric motor 1 comprises an armature shaft 10 which is mounted rotatably in a floating bearing 12 within a cup-shaped pole casing 18. A commutator 20 which is arranged on the armature shaft 10 with an armature 22 and a magnet holder ring 24 with magnets 24.1 are accommodated in the pole casing 18. On the end side, a lid-shaped brush carrier 26 with a central aperture 26.1 for receiving the armature shaft 10 and a second bearing 28 covers the pole casing 18.

Figure 2:
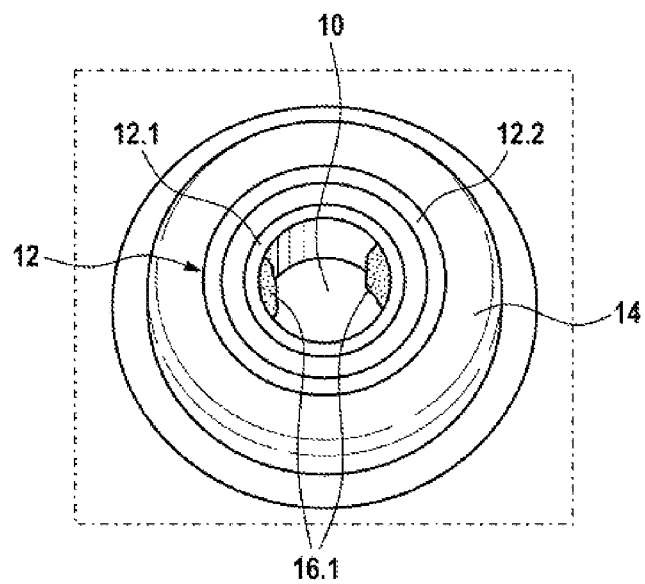
FIG. 2 shows a perspective illustration of the floating bearing of the electric motor according to the disclosure from FIG. 1 before mounting of the armature shaft with lubricant which is introduced on the bearing inner ring.

As can be seen from FIG. 2, the floating bearing 12 in the exemplary embodiment which is shown is configured as an antifriction bearing and, in addition to the rolling bodies, comprises a bearing inner ring 12.1 and a bearing outer ring 12.2.

Figure 3:
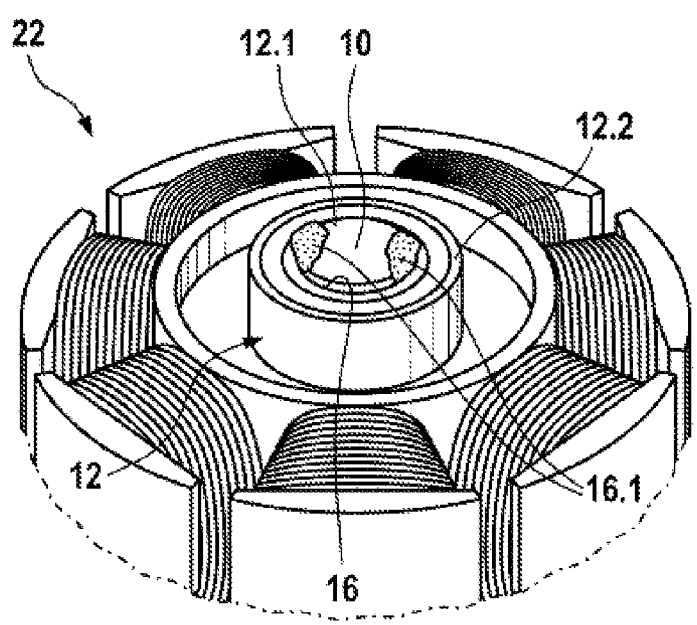
FIG. 3 shows a perspective illustration of the floating bearing of the electric motor from FIG. 1 with a mounted armature shaft.

As can be seen from FIG. 3, the bearing inner ring 12.1 is pushed onto the armature shaft 10 and/or is secured axially by means of a securing element. The bearing outer ring 12.2 is received in a bearing seat (not visible here) of the pole casing 18.

In order to make an electric motor 1 possible with damped radial loading and reduced noise emission, according to the disclosure lubricant 16.1 is introduced between the drive shaft 10 and the bearing inner ring 12.1, which lubricant 16.1 forms a hydrodynamic lubricant film 16 and generates a constant relative movement between the drive shaft 10 and the bearing inner ring 12.1.

In order to ensure a defined lubricating state, the hydrodynamic lubricant film 16 is formed by way of wetting of the bearing inner ring 12.1 with lubricant 16.1. During mounting, lubricant 16.1 which is preferably configured as oil and/or grease is applied between the drive shaft 10 and the antifriction bearing 12. The quantity of the lubricant 16.1 is selected in such a way that a closed hydrodynamic lubricant film 16 is formed. A low requirement of the lubricant 16.1 advantageously arises during the operation of the electric motor, as a result of which the applied quantity of the lubricant 16.1 ensures satisfactory lubrication over relatively long time periods. On account of the satisfactory accessibility of the floating bearing 12, lubricant 16.1 can be applied retrospectively at any time as required. On account of the hydrodynamic lubricant film 16, a constant relative movement with a constant slip between the drive shaft and the antifriction bearing 12 and a low noise development is formed between the drive shaft 10 and the antifriction bearing 12.

The invention claimed is:

1. An electric motor having:
   at least one floating bearing, comprising:
   a bearing inner ring; and
   a bearing outer ring which is received in a bearing seat;
   an armature shaft which is mounted in the at least one floating bearing such that the bearing inner ring is positioned on the armature shaft;
   a fixed quantity of lubricant disposed between and permanently wetting the armature shaft and the bearing inner ring upon relative movement therebetween, wherein the quantity of lubricant is configured and arranged to form and maintain a closed continuous hydrodynamic lubricant film and generate a constant relative movement between the armature shaft and the bearing inner ring; and
   a fixed quantity of lubricant disposed between and permanently wetting the armature shaft and the bearing inner ring, wherein the quantity of lubricant is configured and arranged to form and maintain a closed continuous hydrodynamic lubricant film and generate a constant relative movement between the armature shaft and the bearing inner ring.

2. The electric motor as claimed in claim 1, wherein the lubricant includes at least one of oil and grease.

3. The electric motor as claimed in claim 1, wherein the floating bearing is an antifriction bearing.

4. The electric motor as claimed in claim 1, wherein the fixed quantity of lubricant is introduced between the armature shaft and the bearing inner ring only during assembly of the bearing inner ring on the armature shaft.

5. A fluid pump for a vehicle fluid system having an electric drive, comprising an electric motor that includes:
   at least one floating bearing, comprising:
   a bearing inner ring; and
   a bearing outer ring which is received in a bearing seat;
   an armature shaft which is mounted in the at least one floating bearing such that the bearing inner ring is positioned on the armature shaft; and
   a fixed quantity of lubricant disposed between and permanently wetting the armature shaft and the bearing inner ring upon relative movement therebetween, wherein the quantity of lubricant is configured and arranged to form and maintain a closed continuous hydrodynamic lubricant film and generate a constant relative movement between the armature shaft and the bearing inner ring.

6. The fluid pump as claimed in claim 5, wherein the fixed quantity of lubricant is introduced between the armature shaft and the bearing inner ring only during assembly of the bearing inner ring on the armature shaft.

* * * * *